(12) United States Patent
Zenke

(10) Patent No.: US 6,256,556 B1
(45) Date of Patent: Jul. 3, 2001

(54) REMOTE OPERATION SYSTEM FOR A ROBOT

(75) Inventor: Hideo Zenke, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,834

(22) Filed: May 25, 2000

(30) Foreign Application Priority Data

Nov. 16, 1999 (JP) .................................................. 11-325325

(51) Int. Cl.$^7$ ...................................................... G06F 19/00
(52) U.S. Cl. .......................... 700/245; 700/247; 700/253; 700/255; 700/257; 700/264; 700/251; 700/259; 700/256; 318/568.13; 318/568.14; 318/568.15; 318/568.16; 219/125.11; 219/125.12; 701/2

(58) Field of Search ............................... 700/245, 70, 161, 700/71, 253, 255, 257, 259, 264, 256, 193, 194, 69, 251, 247, 88, 112; 318/568.23, 568.13–568.16, 568.21, 528, 573; 701/2; 219/124.34, 124.33, 6.41, 125.12, 125.11; 90/3, 42, 9; 242/354.2; 436/48

(56) References Cited

FOREIGN PATENT DOCUMENTS

| 3-134713 | 6/1991 | (JP) | ................................ G05B/19/18 |
| 3-178789 | 8/1991 | (JP) | .................................... B25J/9/18 |

*Primary Examiner*—William A. Cuchlinski, Jr.
*Assistant Examiner*—McDieunel Marc
(74) *Attorney, Agent, or Firm*—Sughrue, Mion, Zinn, Macpeak & Seas, PLLC

(57) ABSTRACT

A remote operation system for a robot for facilitating the restoring operation of the robot. In the system, when an abnormal operation or abnormal parameter on a user side is detected, the information of such an abnormality is displayed on the operation terminal of a service staff side and further operation instruction and comments relating to the restoring operation are applied from the service staff side to the operation terminal of the user side and displayed thereon.

3 Claims, 4 Drawing Sheets

REMOTE OPERATION SYSTEM FOR A ROBOT

BACKGROUND OF THE INVENTION

1. Field of the Invention

The present invention relates to a remote operation system for a robot for facilitating the restoring operation of the robot.

2. Description of the Related Art

Since a robot is configured as a system within an automatic production line by a user or a system manufacturer after shipped from a factory, the setting condition (hereinafter referred to as parameters) of the robot itself is surely optimized. These parameters of the robot operate in cooperation from one another. Thus, when a part of the parameters is modified or changed, an unexpected trouble may be caused. Further, when the parameter or the command within the operation instruction applied to the robot is erroneously designated (hereinafter referred to as program miss), a trouble may be caused. When a trouble is caused in the user side due to the program miss, the user determines the cause of the trouble while confirming the parameters of a controller for the robot and the operation instruction program. In the case where the user can not determine or specify the cause, the user writes program or parameters relating to the contents of the trouble on a memo paper etc., then contacts with the robot manufacturer or the service company of the robot by telephone, facsimile or the like and inquires about the cause of the trouble and the method of avoiding the trouble.

However, in recent years, the program has been complicated due to the progress of the technology of the robot. Thus, it has been difficult for a general user to accurately determine the program information relating to the trouble of a robot and contact with the robot manufacturer or the service company of the robot. Further, since a service staff of the robot manufacturer or the service company can not directly look at the robot or the controller thereof (including the parameters thereof), it is difficult for the service staff to determine the cause of the trouble based on the information from the user.

Accordingly, much time is wasted in order to determine the cause of the trouble since it is required for the user and the service staff to contact to each other by telephone or facsimile for many times. Further, when the cause of the trouble can not be determined by the aforesaid method, since it is required to send the service staff to the user side, it takes further time for the staff to move to the user side. In particular, when the user locates at a remote place, there arises a problem that the production efficiency is degraded due to the stop of the robot for a long time and the service fee such as transportation expense becomes large.

Thus, there has been proposed a restoring method as disclosed in Japanese Patent Unexamined Publication No. Hei. 3-178789, wherein, in the case where the trouble of a robot is caused, the robot is restored by using voice of workers in the vicinity of the robot picked up by a microphone or using an image indicating the position or posture of the robot and the state of a control apparatus outputted from a television camera, thereby to eliminate the conventional problem caused by using telephone or facsimile etc.

FIG. 5 is a block diagram showing the remote diagnostic device for the numerically controlled machine tool disclosed in Japanese Patent Unexamined Publication No. Hei. 3-134713, which propose to eliminate the trouble of the numerically controlled machine tool without using the aforesaid means such as telephone or facsimile etc. in a manner that a screen similar to an operation panel is displayed on a CRT serving as a display device and the numerically controlled machine tool is remotely operated by using the displayed screen.

The explanation will be made as to such a conventional device by using FIG. 5. In the figure, reference numeral 20 designates a computer serving as a remote operation terminal; 30, the numerically controlled machine tool to be operated remotely; 40, a communication line; and 42, a modem. Further, reference numeral 21 designates a central processing unit (CPU) of the computer 20; and 25, a key board of the computer 20 which can input signal in the similar manner as the operation of the numerically controlled machine tool. The publication discloses that a mouse, a write pen, a touch panel or the like may be used as a signal input device in place of the key board 25. Reference numeral 27 designates the display device connected to the computer 20 for displaying the operation panel of the numerically controlled machine tool 30.

The operation of such a conventional device will be explained. In the case where a trouble is caused in the numerically controlled machine tool 30, as shown in the figure, a service staff connects the computer 20 to the numerically controlled machine tool 30 by way of the modem 42 and the communication line 40. Then, the service staff turns the computer 20 on to display a screen similar to the operation panel of the numerically controlled machine tool 30 on the display device 27 by the operation of the software dedicated to the terminal. Thereafter, the service staff inputs signal from the key board 25 while seeing the display screen thereby to display the information of the numerically controlled machine tool 30 side on the display device 27 to determine the cause of the trouble and apply the operation instruction from which the cause of the trouble is eliminated to the numerically controlled machine tool 30.

In recent years, due to the progress of the technology of a robot, it has been difficult for a general user to accurately inform a service staff of program information according to the aforesaid failure diagnosis method using telephone or facsimile and so it takes a long time to solve the problem.

The aforesaid method of diagnosing the state of a robot by using voice or image as disclosed in Japanese Patent Unexamined Publication No. Hei. 3-178789 requires a dedicated device such as an expensive camera or monitor etc. Further, in such a method, it is difficult for a user to execute the operation procedure for eliminating the trouble in the same manner as designated by the service staff on the basis of the audio and image information.

Further, in the remote diagnostic device for the numerically controlled machine tool disclosed in Japanese Patent Unexamined Publication No. Hei. 3-134713, even if the cause of the trouble is specified, since it is impossible for the user side to know the operation procedure for eliminating the trouble and so there is a case where the trouble is caused for several times.

SUMMARY OF THE INVENTION

The invention has been made in order to obviate such conventional problems and an object of the invention is to provide a remote operation system for a robot which clearly displays the instruction of a service staff to a user when a trouble of the robot is caused thereby to make it possible for the user to perform the restoring operation of the robot surely.

Another object of the invention is to provide a cheap remote operation system for a robot which does not require a dedicated device for the remote supporting.

In order to achieve the above objects, according to the invention, there is provided a remote operation system for a robot wherein a first operation terminal and a second operation terminal are connected to each other through a communication line and the second operation terminal is connected to a robot controller, the first operation terminal comprising: an interface, connected to the second operation terminal through the communication line, for transmitting and receiving data to and from the second operation terminal; robot operation means for supplying an operation instruction to the robot through the robot controller; restoring method input means for inputting restoring operation information for restoring; display means for displaying information from the second operation terminal and the robot controller; and a microcomputer for controlling the interface, the robot operation means, the restoring method input means and the display means, the second operation terminal comprising: an interface, connected to the first operation terminal through the communication line, for transmitting and receiving data to and from the first operation terminal; robot operation means for supplying an operation instruction to the robot through the robot controller; abnormal operation determining means for determining an abnormal operation instruction within the operation instruction; display means for displaying information from the first operation terminal and the robot controller; instruction generating means for generating instruction from the operation instruction; transmitting means for transmitting the operation instruction generated from the instruction generating means to the robot controller; and a microcomputer for controlling the interface, the robot operation means, the abnormal operation determining means, the display means, the instruction generating means and the transmitting means, and the robot controller comprising: instruction receiving means for receiving the operation instruction generated by the instruction generating means from the second operation terminal; and a microcomputer for controlling the instruction receiving means, wherein information relating to the abnormal operation instruction determined by the abnormal operation determining means is displayed on the display means of the first operation terminal, the restoring operation information for the information relating to the abnormal operation instruction is inputted from the restoring method input means, and the restoring operation information is displayed on the display means of the second operation terminal.

DETAILED DESCRIPTION OF THE PREFERRED EMBODIMENT

Figure 1:
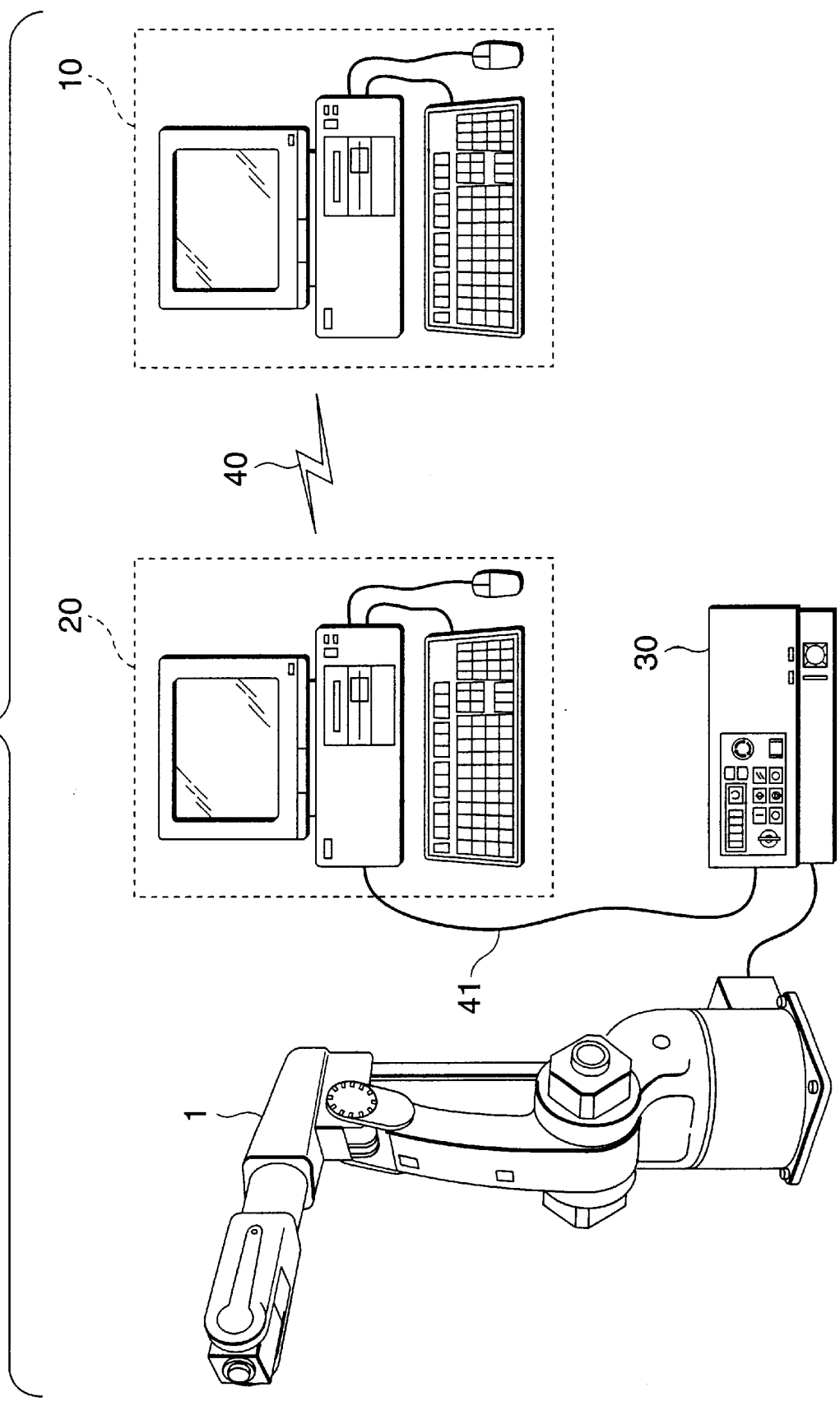
FIG. 1 is a diagram showing the arrangement of a remote operation system for a robot according to an embodiment of the present invention.
Figure 2:
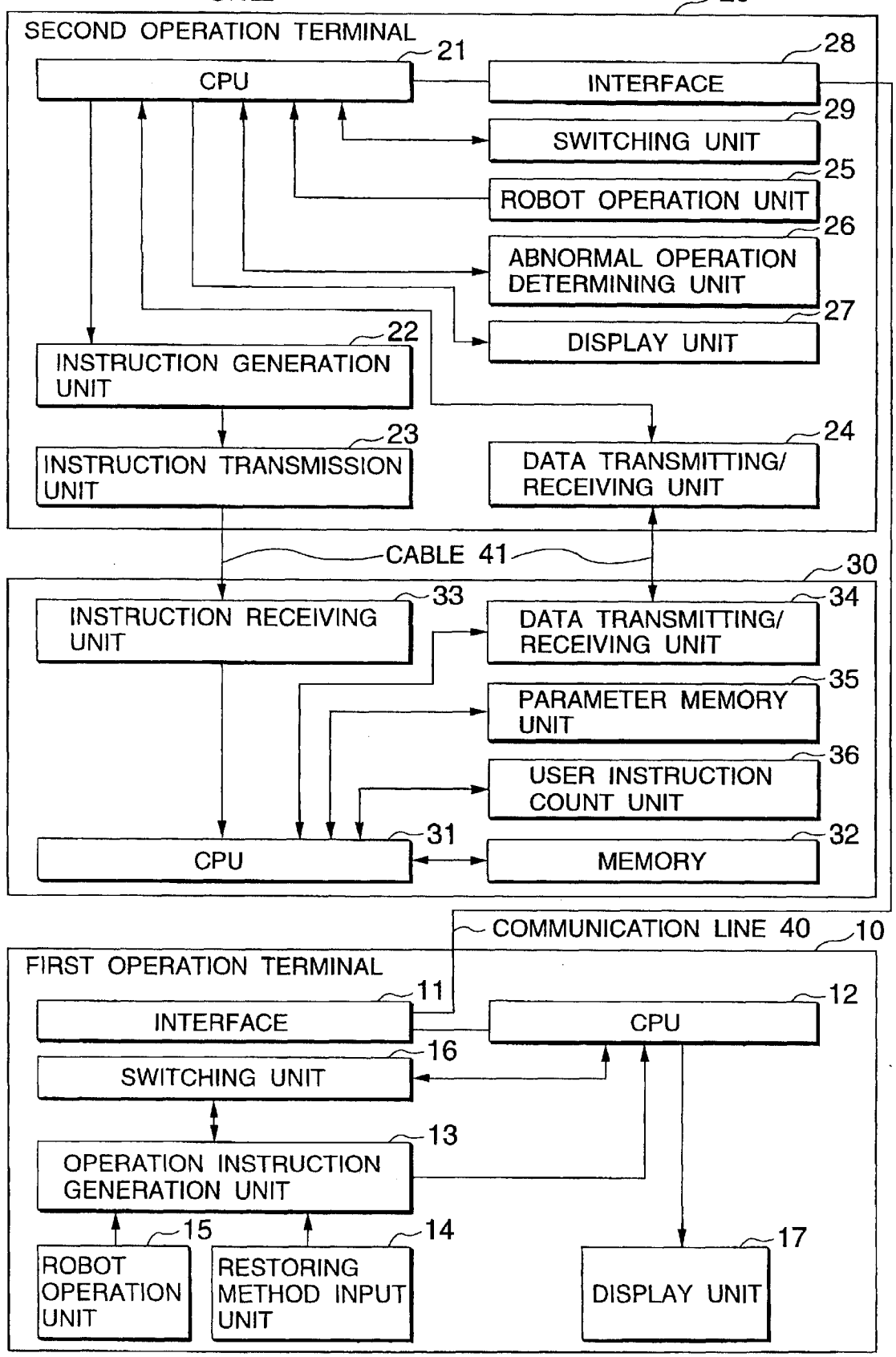
FIG. 2 is a block diagram showing the arrangement of the embodiment.
Figure 3:
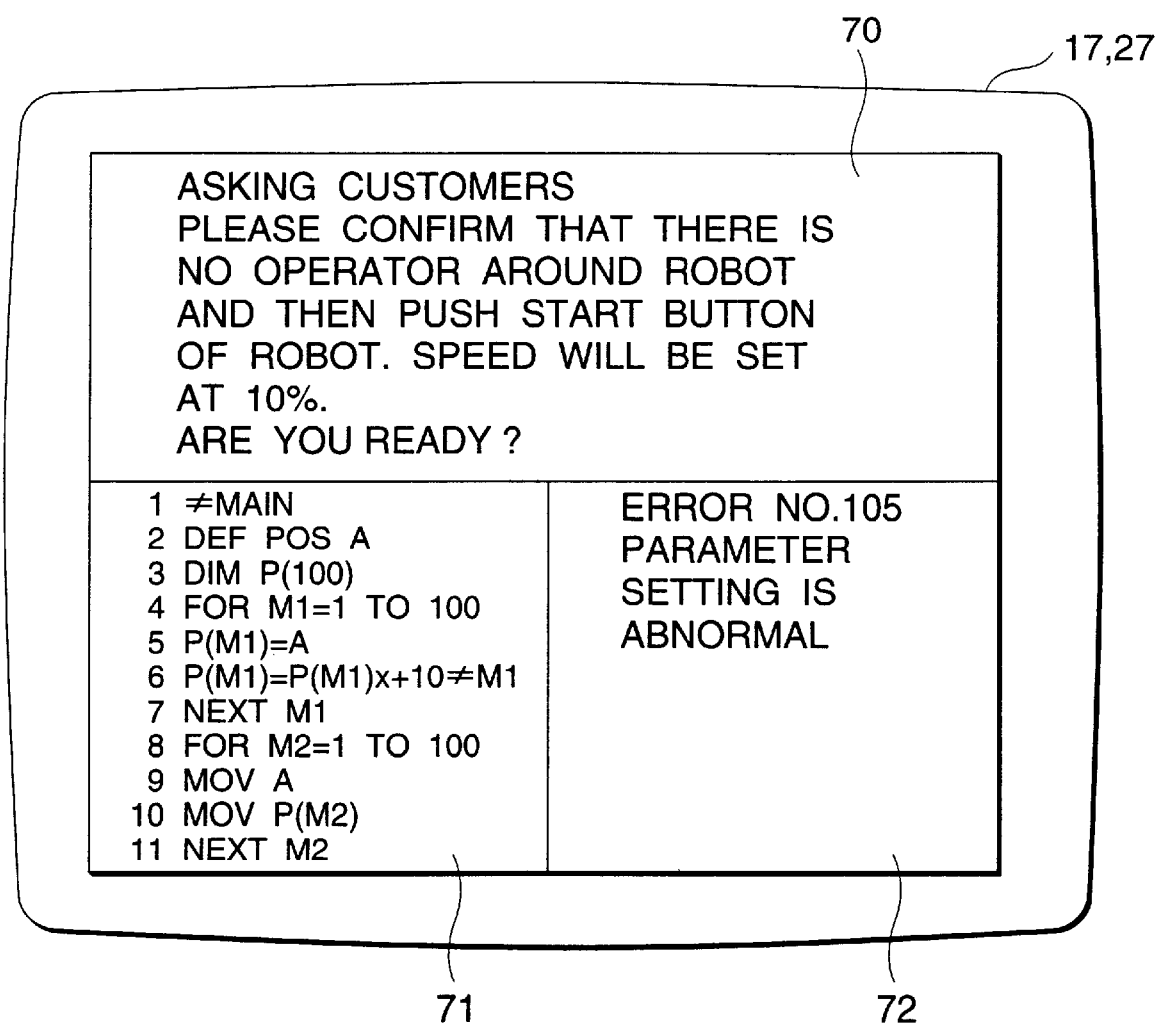
FIG. 3 is a diagram showing a screen displayed on a display unit in the embodiment.
Figure 4:
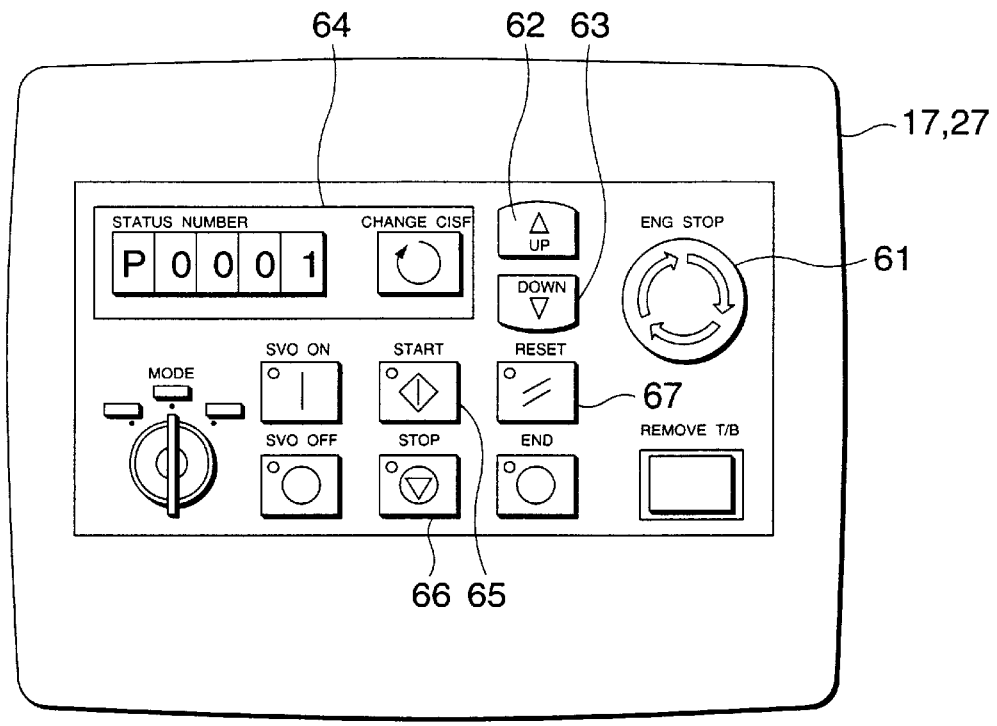
FIG. 4 is a diagram showing another screen displayed on the display unit in the embodiment.
Figure 5:
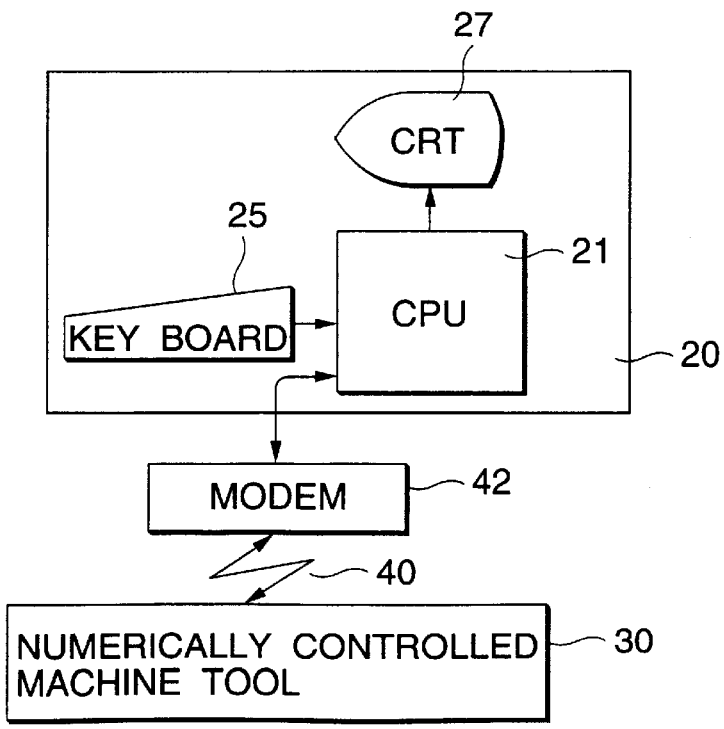
FIG. 5 is a block diagram showing the arrangement of a conventional remote operation system for a robot.

FIG. 1 is a diagram showing the arrangement of a remote operation system for a robot according to an embodiment of the present invention, FIG. 2 is a block diagram thereof and FIGS. 3 and 4 are display screens displayed on the display devices of first and second operation terminals, respectively.

In the figure, reference numeral 1 designates a robot; 10, a first operation terminal which is normally disposed on a service staff side; and 20, a second operation terminal which is used on a user side and coupled to the first operation terminal 10 through a communication line 40 such as a telephone line, a network or the like. Reference numeral 30 designates a controller for controlling the robot 1 to be remotely operated, which is coupled to the second operation terminal 20 through a cable 41.

A general personal computer is used for the first operation terminal 10. The arrangement of the first operation terminal will be explained below. Reference numeral 11 designates an interface for inputting various kinds of information from the second operation terminal 20 and outputting the various kinds of information thereto. A serial interface of a personal computer (hereinafter referred to as PC) is used as the interface. A not-shown modem is connected to the interface to constitute the communication line 40. Reference numeral 12 designates a CPU which controls respective units within the operation terminal 10 and processes various kinds of information from the interface 11. Reference numeral 13 designates an operation instruction generation unit which transmits the concrete operation instruction for the robot 1 inputted by a robot operation unit 15 and the comment relating to the operation inputted from a restoring method input unit 14 to the second operation terminal 20 side through the CPU 12, and simultaneously displays the concrete operation instruction and the comment on a display unit 17. The operation instruction generation unit is formed by the software dedicated for the terminal. The restoring method input unit 14 and the robot operation unit 15 are formed by the keyboard or the mouse of the PC. The robot operation unit 15 inputs and edits operation instructions to the robot 1 and the parameter data. Reference numeral 16 designates a switching unit for changing over an operation right between the first operation terminal 10 and the second operation terminal 20, which corresponds to a flag managed by the software dedicated for the terminal. Reference numeral 17 designates the display unit which displays the parameter data within the controller 30, displays the various kinds of information from the second operation terminal and displays the operation panel screen of the controller 30. The CRT connected to the PC is used as the display unit.

FIG. 3 shows an example of the screen displayed on the display unit 17. In the figure, reference numeral 70 designates a comment display area for displaying the comment information relating to the restoring operation for the user; 71, an operation instruction display area for displaying the operation instruction (program etc.) information of the robot 1; and 72, an abnormal operation display area for displaying the information relating to the operation instruction miss and parameter setting miss.

FIG. 4 shows a screen of the display unit 17 displaying the operation panel same as that of the controller 30. On the screen, there are set an emergency stop button 61, program selection buttons 62, 63, a selected program number display 64, a robot start button 65, a robot stop button 66, an error reset button 67 etc. The cursor of the mouse is displayed on the screen and the robot operation unit 15 is replaced by the mouse attached to the PC. In this state, when the mouse is operated, the operation instruction can be applied to the second operation terminal in the feeling similar to the operation of the operation panel of the control panel 30. Alternatively, in case where the keys of the key board of the PC are allocated to the various kinds of the buttons of the operation panel, the operation similar to that performed by using the mouse can be attained. The software dedicated for the terminal is arranged in a manner that various kinds of screens are prepared in advance so that the kinds of the buttons to be set can be changed in need, and one of the screens can be selected and used in accordance with the object to be used.

A general personal computer is also used for the second operation terminal 20. The arrangement of the second operation terminal will be explained below. Reference numeral 21 designates a CPU which controls respective units within the second operation terminal 20 and processes various kinds of information between the first operation terminal 10 and the controller 30. Reference numeral 22 designates an instruction generating unit which generates operation instructions to the robot 1; and 23, an instruction transmission unit which transmits the operation instructions to the controller 30. Reference numeral 24 designates a data transmitting/receiving unit which receives the various kinds of data from the controller 30 and transmits the various kinds of data thereto and is formed by a serial interface of the PC. Reference numeral 25 designates a robot operation unit which inputs the control input for the second operation terminal 20, inputs the operation instructions to the robot 1 and changes the parameter data. The robot operation unit is formed by a key board, a mouse or the like for the PC. Reference numeral 26 designates an abnormal operation determining unit for detecting the program miss and the setting miss of the parameters. Reference numeral 27 designates a display unit for displaying the parameter data within the controller 30, the various kinds of information from the first operation terminal and the operation panel screen of the controller 30. The CRT connected to the PC is used as the display unit.

Since the screens displayed on the display unit 27 are same as those described in the explanation of the first operation terminal as shown in FIGS. 3 and 4, the explanation thereof is omitted. Reference numeral 28 designates an interface for inputting various kinds of information from the first operation terminal 10 and outputting the various kinds of information thereto. The serial interface of the PC is used as the interface. Reference numeral 29 designates a switching unit for changing over an operation right between the first operation terminal 10 and the second operation terminal 20. The priority of the operation right is set by the software dedicated for the terminal in the order of the first operation terminal 10 and the second operation terminal 20.

Then, the configuration of the controller 30 will be explained. Reference numeral 31 designates a CPU which controls the respective units within the controller 30, processes the operation instructions or operation control instructions from the instruction transmission unit 23, performs data input/output processing between the data transmitting/receiving unit 24 and the CPU, and controls the operation of the robot 1. Reference numeral 32 designates a memory for storing program for the CPU 31. Reference numeral 33 designates an instruction receiving unit which receives the operation instructions from the operation terminal 20. Reference numeral 34 designates a data transmitting/receiving unit which transmits the parameter data of the controller 30 to the operation terminal 20 and receives the parameter data transmitted from the operation terminal 20. Reference numeral 35 designates a parameter memory unit which stores the parameter data for controlling the robot. Reference numeral 36 designates a user instruction count unit which counts and stores the number of appearance of user auxiliary instructions. The user auxiliary instructions is opening/closing instructions for robot hands, drive instructions for an XY table driven in association with the robot or the like, for example. Each of the parameter memory unit 35 and the user instruction count unit 36 may be replaced by the memory 32.

The explanation will be omitted as to an input/output device, such as a motor and a drive circuit for driving the robot 1, for the various kinds of the signals transmitted between the robot 1 and the controller 30.

The operation of the embodiment will be explained. In the case where the operation instruction inputted from the robot operation unit 25 by a user is erroneous and a trouble can not be solved, the user contacts with the service company of the robot and connects the first operation terminal 10 with the second operation terminal 20 on the user side by means of the communication line 40. Then, the execution is made as to the operation instruction inputted by the user from the robot operation unit 25. In case where the operation instruction is erroneous, the abnormal operation determining unit 26 detects the contents of the abnormality, and displays the error number and the error contents in the abnormal operation display area of the display unit 27 and then transmits the error information to the first operation terminal 10 side by means of the CPU 21. Thereafter, the CPU 12 displays the error number and the error contents in the abnormal operation display area of the display unit 17 thereby to let the service staff know them. Thus, the service staff determines the contents of the abnormality displayed on the display unit 17 and transmits the operation instruction for the robot 1 and the comments as to the restoring method each for the user to the second operation terminal 20.

First, the explanation will be made as to the transmission of the comments relating to the restoring method. The service staff prepares the comments for the user such as matters that require attention relating to the operation of the robot 1 by inputting character sequence from the restoring method input unit 14 with reference to the comment display area of the display unit 17, and sends the information of the comments to the display unit 27 to display on the comment display area 70 thereof, whereby it is possible to make the user confirm the comments.

In the case where the service staff operates by using the screen, it is feared that the service staff may forget to input a supplementary instruction such as reduction of the speed. Such an omission of the working instruction can be prevented by setting the system in a manner that the message is generated automatically in accordance with the content of the error.

Then, the explanation will be made as to the transmission of the operation instruction. The service staff operates the first operation terminal to display the operation panel screen shown in FIG. 4 on the display unit 17 and inputs the operation instruction through the robot operation unit 15. When the service staff operates the mouse to push the program selection button 62 of the operation panel screen of the display unit 17, the operated information is transferred to the display unit 27 side by way of the operation instruction generation unit 13 so that the user can confirm through the screen that the program selection button 62 was pushed. Simultaneously, the operation instruction information is stored in a not-shown memory of the second operation terminal. It is possible to selectively transmit the series of operation instructions thus transmitted to the robot controller 30 side as it is to operate the robot 1. Alternatively, the series of operation instructions may be stored in the second operation terminal 20 so that the operation instruction can be activated also from the robot operation unit 25 in accordance with the states of the switching units 16 and 29.

Although the explanation of the screen relating to the comments shown in FIG. 3 has been made separately from that of the screen relating to the operation instruction shown in FIG. 4, both the comments and the operation instruction may be displayed on the same screen. In this case, it is possible to simultaneously and surely supply both the operation instruction and the comments relating to the restoring of the trouble to the user.

As described above, since the invention is configured in the aforesaid manner, the following technical advantages can be obtained.

That is, according to the invention, since the invention is arranged in a manner that the abnormal operation of the user side is detected and the information relating to the abnormal operation is displayed on the operation terminal of the service staff side, the service staff can supply the restoring operation instruction to the operation terminal of the user side after sufficiently understanding the contents of the abnormal operation, so that the restoring operation can be performed with less mistake.

What is claimed is:

1. A remote operation system for a robot wherein a first operation terminal and a second operation terminal are connected to each other through a communication line and said second operation terminal is connected to a robot controller, said first operation terminal comprising:

an interface, connected to said second operation terminal through the communication line, for transmitting and receiving data to and from said second operation terminal;

robot operation means for supplying an operation instruction to said robot through said robot controller;

restoring method input means for inputting restoring operation information for restoring;

display means for displaying information from said second operation terminal and said robot controller; and a microcomputer for controlling said interface, said robot operation means, said restoring method input means and said display means, said second operation terminal comprising:

an interface, connected to said first operation terminal through the communication line, for transmitting and receiving data to and from said first operation terminal;

robot operation means for supplying an operation instruction to said robot through said robot controller;

abnormal operation determining means for determining an abnormal operation instruction within the operation instruction;

display means for displaying information from said first operation terminal and said robot controller;

instruction generating means for generating instruction from the operation instruction;

transmitting means for transmitting the operation instruction generated from said instruction generating means to said robot controller; and a microcomputer for controlling said interface, said robot operation means, said abnormal operation determining means, said display means, said instruction generating means and said transmitting means, and said robot controller comprising:

instruction receiving means for receiving the operation instruction generated by said instruction generating means from said second operation terminal; and a microcomputer for controlling said instruction receiving means, wherein information relating to the abnormal operation instruction determined by said abnormal operation determining means is displayed on said display means of said first operation terminal, the restoring operation information for the information relating to the abnormal operation instruction is inputted from said restoring method input means, and the restoring operation information is displayed on said display means of said second operation terminal.

2. The remote operation system for a robot according to claim 1, wherein each of said first and second operation terminals is formed by a personal computer.

3. The remote operation system for a robot according to claim 1, wherein input screens of an operation panel of said robot controller are displayed on said display means of said first operation terminal and said display means of said second operation terminal, respectively, the operation instruction inputted from said robot operation means of said first operation terminal is displayed on said display means of said second operation terminal, and the operation instruction is executed by one of said first and second operation terminals.

* * * * *